Patented Sept. 29, 1936

2,055,763

UNITED STATES PATENT OFFICE 2,055,763

PROCESS FOR SULPHATION OF OLEFINES

Paul S. Greer and Richard Gorman, Jr., Charleston, W. Va., assignors, by mesne assignments, to Union Carbide and Carbon Corporation, a corporation of New York No Drawing. Application December 13, 1934, Serial No. 757,334

15 Claims. (Cl. 260—156)

The invention relates to the production, from olefines, of alcohols and ethers, as well as certain intermediate dialkyl sulphates which readily are hydrolyzable to the corresponding alcohols or ethers.

Processes for the sulphation of olefines and the production of alcohols are well known. They generally involve the absorption of a gaseous or other olefine in concentrated sulphuric acid, thereby producing a dialkyl sulphate. The reaction mixture is diluted with water, and the mixture of dialkyl and mono alkyl sulphates is hydrolyzed. The mixture from the hydrolysis, containing the alcohol and/or ether produced, is conducted into one or more stripping stills and is heated at a temperature sufficient to strip therefrom said alcohol and/or ether.

While in such process the dialkyl sulphate readily may be separated from the strong acid liquor by dilution of the latter with water, due to the insolubility of the former in the diluted sulphuric acid, in instances where the acid liquor is produced by absorbing olefines in clean pure sulphuric acid, this is rarely possible in commercial practice where, for reasons of economy, the dilute sulphuric acid remaining after the separation of the dialkyl sulphate is concentrated and reused for the absorption of additional olefines. In the latter case, the acid, after a few cycles of absorption and reconcentration, picks up a substantial amount of carbonaceous and similar impurities often amounting to .5% to 1% or more. Such impurities probably are products resulting from the decomposition of polymerization products of olefines, first entering the acid cycles in the absorber, and subsequently decomposed by heat in the batch stills and concentrators respectively employed for recovery of the alcohols and ethers produced, and for the concentration of the sulphuric acid.

In the presence of an appreciable amount of this carbonaceous material, the dialkyl sulphate forms a stable emulsion with the diluted sulphuric acid, following the addition of water, and is not readily removable therefrom. Because of this, not only is it very difficult to isolate and recover the pure dialkyl sulphate but, moreover, the presence of this finely-divided carbonaceous material in the hydrolyzed acid liquor subsequently undergoing distillation for the recovery and removal of alcohol and/or ether, causes this liquor to foam, particularly during this distillation, and seriously interferes with the operation. Attempts to eliminate this condition by the employment of various anti-foam agents have not been entirely successful since apparently variations in the carbonaceous impurities present in various batches, materially affects the efficacy of the anti-foam agents, so that the same agent may not successfully treat successive batches of acid liquor. Moreover, these agents give but temporary relief, and introduce additional impurities which often are incompletely removed from the system thereafter.

A still more important objection to the presence of such carbonaceous impurities in the reaction system resides in the fact that the presence of such material causes active decomposition of the sulphuric acid in the acid concentrators, not only destroying a substantial amount of this reagent, but producing substantial volumes of sulphur dioxide gas that must be eliminated.

Attempts heretofore have been made to remove from the system these carbonaceous impurities by diluting the concentrated acid liquor from the absorbers with a volatile solvent for the dialkyl sulphate, followed by an isolation of the solvent solution and its subsequent treatment for the recovery of dialkyl sulphate. The undissolved residue separately was processed for acid recovery. According to another plan, the concentrated acid liquor from the absorber was treated with a volatile non-solvent for the dialkyl sulphate, which has the property of flocculating the carbonaceous matter. The latter was then removed from the strong absorber acid liquor. The separation of the dialkyl sulphate from the acid liquor was effected upon a subsequent treatment with water. Such processes are subject to the objection that the carbon present appears to be held in a highly dispersed colloidal form in the concentrated acid, thus rendering its separation therefrom slow and quite difficult. Furthermore, the concentrated acid liquors are somewhat unstable, and contain valuable volatile constituents such as olefines, volatile solvents, ether, and alcohol, requiring special care in their treatment if large material losses are to be prevented. The necessary further step required for the recovery of the volatile solvent employed introduces an additional item of expense.

The present invention is based in important part upon the discovery that the finely-divided suspension of carbon, which gradually accumulates in a cyclic system of the nature described, readily may be removed from the dilute, stripped acid liquor, in whole, or in amounts sufficient to prevent or greatly reduce in the process the aforementioned foaming in the alcohol- and ether-stripping stills, and the decomposition of sulphuric acid in the acid concentrators, while preventing losses of valuable constituents formed in the process.

In its broader scope the invention involves the separation of this finely-divided carbon from the hot dilute sulphuric acid solution withdrawn from the alcohol-stripping stills and moving to the acid concentrators. Such stripped acid liquor contains no valuable volatile constituents. An analysis of a representative sample of such stripped acid liquor follows:

| | |
|---|---|
| Sulphuric acid content | 35.0% |
| Carbon content, by oxidation | 0.5% |
| Water content | 64.5% |
| Density at 20° C. | 1.26 |
| Temperature | 100° C. |
| Appearance of liquid | Opaque, black |

The residual weak acid, free from these carbonaceous constituents, or containing less than .2% thereof, is then subjected to concentration in well known manner, following which the concentrated and cooled sulphuric acid is flowed to the absorber, where it is caused to absorb additional olefine in another cycle.

While according to the invention the carbonaceous impurities may be removed in a number of ways, such as by centrifuging, electrical precipitation, and settling, with or without the aid of flocculation by chemicals, it is preferred to effect such separation by filtration of the weak acid liquor, either at the temperature at which it flows from the stripping still or therebelow. Mechanical filtration, conducted in a filter press of the usual type, may be employed. However, it is preferred, for reasons of economy, to employ a gravity-type filter, the action of which, if desired, may be assisted by the employment of a low pressure upon the filter bed, or by suction applied to the filter outlet.

A very satisfactory gravity-type filter for the filtration of stripped weak sulphuric acid liquor containing around 30% to 40% of sulphuric acid is one having a filter bed of cinders of graduated sizes, about 15 to 18 inches deep. However, filter beds ranging from 1 to 4 feet in thickness, and constructed of crushed stone, sand, and fuller's earth, have been successfully employed in the process.

In conjunction with such filtration, cinders, sand, fuller's earth, pumice, filter-cel, bentonite, rotten-stone, and the like may be mixed with the unfiltered liquor and employed as filter aids. Their use is particularly efficacious when filtering ethanol weak acid, i. e. the dilute sulphuric acid liquor from ethanol stripping stills. In filtering isopropanol weak acid, a bed of cinders alone, of about 15 inches in depth, yields excellent results, and provides a filtrate which may safely be concentrated in the usual manner without acid decomposition, and the concentrate from which, after olefine absorption, readily responds to a treatment with water for the isolation of the dialkyl sulphate. The products of hydrolysis then may be processed in stripping stills without objectionable foaming. When filtering ethanol weak acid, generally it is desirable to mix with the cinders 10% or more of sawdust or the equivalent, and to provide a filter bed around 2 feet in depth, to facilitate a sufficiently rapid and full separation of the large amount of carbonaceous impurities from that liquor.

In one example of the practice of the invention, isopropanol weak acid was rapidly filtered by gravity through a filter bed of cinders 18 inches in depth, the lower 6 inches of which were foundation only, of size between .67 mesh and 2.0 mesh, (Tyler); the next 6 inches of material ranging in size between 2 mesh and 40 mesh (Tyler), formed the filter medium; and the top 6 inches were formed of cinders used for filter aid, ranging from 1 to 2 mesh (Tyler), employed to keep the filter cake porous. The cinders employed were produced in a power plant furnace, and were classified with Tyler standard screens. The filter bed was washed with water and drained before passing the weak acid through it. During filtration, around 15 to 18 inches of acid head were kept above the filter bed. Under these conditions the weak acid liquor was suitably filtered at an average rate of around 75 liters per square foot per hour, yielding an effluent which could readily be processed in the manner hereinbefore described, without the occurrence of the objectionable acid decomposition, and foaming of the hydrolyzed sulphate in the batch stills.

In instances where filtration is employed for the separation of carbonaceous impurities from weak sulphuric acid liquor having an acid concentration of from around 30% to around 40% sulphuric acid, rapid filtration through a bed of cinders, sand or the equivalent, of graduated sizes with the finer particles thereof at the top, provides a clear filtrate from opaque black feed acid liquor containing .5% to 1% or more of total carbon. This clear filtrate may still contain dissolved and miscible organic materials up to about .2% carbon by weight. While these materials will decompose on heating and darken the concentrated acid, their presence in these small amounts is inconsequential in so far as it concerns the operation of the alcohol units, and does not cause objectionable decomposition of the sulphuric acid during concentration, nor foaming in the alcohol still.

It is not essential that any particular form or type of filter be employed in the above-mentioned filtration of the weak acid liquor. On the contrary, any filter unit adapted to operate under gravity head, under pressure, or under vacuum, and employing a stationary or movable filter bed adapted to have the filter medium maintained intact as an integral body during filtration, may be employed. Gravity filtration generally is preferred, particularly in the processing of isopropanol weak acid liquor, since a rapid rate of gravity filtration successfully removes sufficient of the impurities to effect the desired results already mentioned, and is relatively inexpensive and readily controlled.

It is not necessary, in the practice of the invention, to separate the dialkyl sulphate from the mono alkyl sulphate, upon treatment of the strong acid absorption liquor with water, unless it is desired to recover the dialkyl sulphate as such. On the contrary, it is generally desirable, upon the addition of water, to hydrolyze the mixture of dialkyl and mono alkyl sulphates present, and then to distill the resultant mixture to recover the alcohol and ether therefrom.

The present invention is adapted for use not only in the processing of weak acid liquors that have been formed in connection with the production of alcohols and ethers from normally gaseous olefines such as ethylene and propylene, but likewise in the processing of the butylenes, amylenes, and the higher olefines, wherein at one stage of the process a weak acid liquor containing solid impurities is produced upon dilution with water of a strong acid solution of dialkyl compounds.

In the successful practice of the present invention, it is unnecessary continuously to treat all of the weak acid liquor flowing to the concentrators from the alcohol-stripping stills for removal of the solid impurities. In many instances, the desired objects may be attained upon by-passing around 25% or more of such weak acid liquor through a filter or other separating device of suitable type, and conducting the filtered acid liquor to a concentrator where it is mixed with the unfiltered remainder of the weak acid liquor. The resultant mixture then is concentrated in the usual manner.

The weak acid liquor may be treated in the manner indicated, either while hot or after cooling the same, though the former is preferred in the interests of economy.

The invention is susceptible of modification within the scope of the appended claims.

We claim:

1. In the process of producing alcohols and ethers from olefines, in which a weak aqueous sulphuric acid liquor is concentrated, and an olefine is thereafter absorbed in such concentrated liquor, the step which comprises separating from the said dilute aqueous sulphuric acid liquor carbonaceous impurities present therein prior to concentrating the said liquor.

2. In the process of producing alcohols and ethers from olefines, in which a weak aqueous sulphuric acid liquor is concentrated, and an olefine is absorbed in the concentrated liquor, the step which comprises filtering from the said weak aqueous acid liquor carbonaceous impurities present therein prior to concentrating the said liquor.

3. In the process of producing alcohols and ethers from olefines, in which a weak aqueous sulphuric acid liquor is concentrated, and an olefine is absorbed in the concentrated liquor, the step which comprises filtering under gravity head from the said weak aqueous acid liquor carbonaceous impurities present therein prior to concentrating the said liquor.

4. In the process of producing alcohols and ethers from olefines, in which a weak aqueous sulphuric acid liquor is concentrated and an olefine is absorbed in the concentrated liquor, the steps which comprise treating at least around 25% of the said weak aqueous sulphuric acid liquor to separate therefrom carbonaceous impurities present therein, mixing the thus-treated portion of the liquor with the remainder of untreated acid liquor, and subjecting the mixture to a treatment for concentrating the sulphuric acid liquor.

5. In the process of producing alcohols and ethers from olefines, in which a weak aqueous sulphuric acid liquor is concentrated and an olefine is absorbed in the concentrated liquor, the step which comprises filtering from the said weak aqueous acid liquor carbonaceous impurities present therein in excess of about .2% prior to concentrating the said liquor.

6. In the process of producing alcohols and ethers from olefines, in which a weak sulphuric acid liquor is concentrated and an olefine is absorbed in the concentrated liquor, water is added to the resultant mixture, the organic sulphate solution is hydrolyzed, and the alcohols and ethers thus produced are stripped from the weak acid liquor containing carbonaceous impurities, the step which comprises separating from the stripped weak acid liquor carbonaceous impurities present therein, and concentrating the thus-treated weak sulphuric acid liquor.

7. In the process of producing alcohols and ethers from olefines, in which a weak sulphuric acid liquor is concentrated and an olefine is absorbed in the concentrated liquor, water is added to the resultant mixture, the organic sulphate solution is hydrolyzed, and the alcohols and ethers thus produced are stripped from the weak acid liquor containing carbonaceous impurities, the step which comprises filtering from the stripped weak acid liquor carbonaceous impurities present therein, and concentrating the thus-treated weak sulphuric acid liquor.

8. In the process of producing isopropyl alcohol which includes the steps of absorbing propylene in concentrated sulphuric acid and treating the reaction mixture with water, and wherein a weak aqueous sulphuric acid liquor which is recovered in one stage of the process is concentrated for recycling in the process, the steps which comprise separating from the said weak aqueous acid liquor carbonaceous impurities present therein in excess of around .2%, and thereafter concentrating the thus-treated acid liquor prior to recycling the same.

9. In the process of producing ethanol which includes the steps of absorbing ethylene in concentrated sulphuric acid and treating the reaction mixture with water, and wherein a weak aqueous sulphuric acid liquor which is recovered in one state of the process is concentrated for recycling in the process, the steps which comprise separating from the said weak aqueous acid liquor carbonaceous impurities present therein in excess of around .2%, and thereafter concentrating the thus-treated acid liquor prior to recycling the same.

10. In the process of producing alcohols and ethers from olefines, in which a weak sulphuric acid liquor is concentrated and an olefine is absorbed in the concentrated liquor, water is added to the resultant mixture, the organic sulphate solution is hydrolyzed, and the alcohols and ethers thus-produced are stripped from the weak acid liquor containing carbonaceous impurities, the step which comprises filtering under gravity head from the stripped weak acid liquor carbonaceous impurities present therein, and concentrating the thus-treated weak sulphuric acid liquor.

11. The cyclic process of preparing dialkyl sulphates from olefines, which comprises the steps of distilling alcohol and ether from a mixture containing the same together with a dilute aqueous solution of sulphuric acid containing carbonaceous impurities, separating from the said aqueous solution at least the portion of the said impurities present in excess of about .2%, concentrating the resultant sulphuric acid liquor, absorbing an olefine in the concentrated acid liquor thereby producing a dialkyl sulphate, diluting the reaction mixture with water, thereby separating the dialkyl sulphate, recovering the latter, and hydrolyzing the remaining sulphates, thereby forming alcohol and ether, and continuously repeating the said cycle of steps.

12. The process of producing an alcohol from a gaseous olefine, which comprises the steps of absorbing the olefine in concentrated sulphuric acid, adding water to the resultant mixture, thereby hydrolyzing alkyl sulphates therein, separating the alcohol thus produced from the residual weak sulphuric acid liquor containing appreciable amounts of carbonaceous impurities, segregating at least a substantial portion of the weak acid liquor, separating from such portion carbonaceous impurities present therein, mixing the resultant liquid residue with the untreated weak acid liquor, concentrating the resultant mixture of weak acid liquor, and thereafter absorbing an olefine in the concentrated liquor.

13. In the process of producing alcohols and ethers from olefines, in which a dilute aqueous sulphuric acid solution is concentrated, an olefine thereafter is absorbed in the concentrated liquor thereby forming organic sulphates, the latter are hydrolyzed in the presence of a diluent, and the products of the said hydrolysis are stripped from the residual dilute sulphuric acid liquor containing carbonaceous impurities, the steps which comprise separating from the stripped dilute acid liquor at least a substantial portion of the said impurities, and thereafter concentrating the said liquor for reuse in the process.

14. In the process of producing alcohols and ethers from olefines, in which a dilute aqueous sulphuric acid solution is concentrated, an olefine thereafter is absorbed in the concentrated liquor thereby forming organic sulphates, the latter are hydrolyzed in the presence of a diluent, and the products of the said hydrolysis are stripped from the residual dilute sulphuric acid liquor containing carbonaceous impurities, the steps which comprise treating at least a portion of the said stripped dilute acid liquor to separate therefrom at least a substantial portion of the carbonaceous impurities, mixing the thus-treated portion of the liquor with the remainder of the stripped dilute acid liquor, and thereafter concentrating the said liquor for reuse in the process.

15. In the process of producing alcohols and ethers from olefines, in which a dilute aqueous sulphuric acid solution is concentrated, an olefine thereafter is absorbed in the concentrated liquor thereby forming organic sulphates, the latter are hydrolyzed in the presence of a diluent, and the products of the said hydrolysis are stripped from the residual dilute sulphuric acid liquor containing carbonaceous impurities, the steps which comprise separating from the dilute stripped acid liquor at least the portion of carbonaceous impurities present therein in excess of about .2%, and thereafter concentrating the said liquor for reuse in the process.

PAUL S. GREER.
RICHARD GORMAN, Jr.